(12) United States Patent
Ohshima

(10) Patent No.: US 8,289,540 B2
(45) Date of Patent: Oct. 16, 2012

(54) OUTPUT MANAGEMENT DEVICE SETTING APPARATUS AND SETTING METHOD

(75) Inventor: Masamichi Ohshima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 562 days.

(21) Appl. No.: 11/845,493

(22) Filed: Aug. 27, 2007

(65) Prior Publication Data

US 2007/0297006 A1 Dec. 27, 2007

Related U.S. Application Data

(62) Division of application No. 10/385,108, filed on Mar. 10, 2003, now abandoned.

(30) Foreign Application Priority Data

Mar. 12, 2002 (JP) ................................. 2002-067538

(51) Int. Cl.
*G06F 3/12* (2006.01)
(52) U.S. Cl. ..................... 358/1.15; 358/1.13; 358/1.14; 358/1.16; 358/402; 709/200; 709/221
(58) Field of Classification Search ......................... None
See application file for complete search history.

(56) References Cited

U.S. PATENT DOCUMENTS

| 6,474,881 | B1 * | 11/2002 | Wanda ............................ 400/61 |
| 7,016,060 | B1 * | 3/2006 | Carney et al. ................. 358/1.15 |
| 2002/0089684 | A1 * | 7/2002 | Barry et al. .................. 358/1.14 |
| 2003/0084132 | A1 * | 5/2003 | Ohta ............................. 709/221 |
| 2003/0174359 | A1 * | 9/2003 | Gomi ........................... 358/1.15 |
| 2006/0170967 | A1 * | 8/2006 | Maki et al. ................... 358/1.15 |

FOREIGN PATENT DOCUMENTS

| JP | 2000-122833 | 4/2000 |
| JP | 2001-117834 | 4/2001 |

* cited by examiner

*Primary Examiner* — Twyler Haskins
*Assistant Examiner* — Pawandeep Dhingra
(74) *Attorney, Agent, or Firm* — Carter, DeLuca, Farrell & Schmidt LLP

(57) ABSTRACT

It is an object of the present invention to install a print server simply. In the present invention, a port monitor, an IP address and a data sending method corresponding to an installed logical printer are acquired and stored in an installed logical printer information storage module, by an installed logical printer analysis module. A logical printer auto-creation module creates the port monitor of the logical printer to be used by the print server to be installed, based on the stored information, and associates the port monitor as the port monitor of a newly created logical printer or the existing logical printer.

6 Claims, 10 Drawing Sheets

OUTPUT MANAGEMENT DEVICE SETTING APPARATUS AND SETTING METHOD

RELATED APPLICATION INFORMATION

This application is a divisional of co-pending U.S. application Ser. No. 10/385,108 filed Mar. 10, 2003, which is incorporated herein by reference.

FIELD OF THE INVENTION

The present invention relates to an output management device setting apparatus and a setting method thereof and the like to be used for setting procedures necessary for operating, for example, a print server apparatus (hereinafter, also simply referred to as "print server") for providing a distributed printing service via a computer network, a distributed printing system which has a terminal device such as a personal computer as an output management device connected to a printer in two-way communication therewith, or the like.

BACKGROUND OF THE INVENTION

In recent years, for example, a laser beam printer having high printing grade has been generally used even at an office whose business is not printing itself, due to development in low cost printers. In addition, networking of computer devices used in the office has been also developed significantly in recent years. Against such a background, it has not been exceptional to use a plurality of printers connected to a network in an ordinary office. As such a printer usage form has become general, how to utilize the plurality of printers connected to the network effectively has become a new challenge.

In network systems, in order to print with a personal computer (PC) as a network terminal, there are many network systems provided with a print server such that the PC enables to print without exchanging print data, control information and the like with the printers by itself. Providing the print server provides mainly the following merits (1) and (2).

(1) It is possible to minimize processes dependent on an individual printer running on a client PC, and put loads for that to the print server. Thereby, for example, when a user executes a printing process of a document on the client PC, it is possible to reduce a processing time on the above described client PC, that is, the user's wait time.

Specifically, for example, if "Microsoft Windows®" (hereinafter, referred to as "Windows") is used as an operating system (OS) of the client PC and the client PC executes the printing process with the printer via the print server, the client PC generates an intermediate file independent of the printer (the intermediate file), instead of a data file inherent to the printer which may be processed directly by the printer (the data file including control commands inherent to the above described printer), and sends the above described intermediate file to the print server.

The print server generates the data inherent to the printer based on the intermediate file from the client PC, sends the above described data (printer-dependent commands) to the printer. Therefore, the client PC may reduce processes for printing by means of the printer, via the print server.

(2) It is possible to process a value-added print job.

For example, by setting a priority for processing for each print job, if a plurality of print jobs become simultaneously waiting to be processed, a processing order may be determined based on the priorities which the print jobs have. Therefore, it may be possible to print the print job of a document which is necessary to print urgently and the like, in preference to others. In addition, for example, the print server may provide an alternate printing service for selecting another printer instead to execute the printing process, if an error has been occurred in the printer to which the print server attempts to send the print job received from the client PC, a distributed printing service for logically splitting one print job and causing the plurality of printers to execute the printing process in parallel in order to reduce a printing time, and the like.

Here, the above described distributed printing service will be described specifically. For example, in a network print system, it is assumed that "Windows" is used as the operating system (OS) of the client PC and the print server, and the client PC executes the printing process with the printer via the print server.

First, a system manager prepares one or more logical printers on the print server.

On the other hand, the logical printer corresponding to the logical printer prepared on the print server is created on the client PC.

"Logical printer" as used herein is a physical printer modeled on the OS, that is, "Windows", and is for example, a printer driver used in conversion from document data into the data to be sent to the printer, or an object managing various information such as a destination for outputting the data of the print job, and the like.

When the user of the client PC, on which "Windows" operates, executes to print with an application program, he specifies the logical printer and gives an instruction to execute the printing.

Thereby, "Windows" operating on the client PC converts a draw command received from the application program into a data format called an EMF format.

"EMF format" is the data format which inherits characteristics of a graphics system called "GDI" of "Windows", which is independent of the devices (the printer and the like), and does not include any command or information dependent on the devices.

Then, "Windows" on the client PC transfers the print job data converted into the EMF format to the print server.

"Windows" on the print server stores the print job data in the EMF format received from the client PC, on a memory such as a hard disk temporarily, thereafter reads the print job data in the EMF format from the above described memory, and converts the above described read data into the data format of a page description language (PDL) supported by the above described printer, using the printer driver of the printer with which the printing process is to be executed.

Subsequently, "Windows" on the print server sends the converted print job data as described above to the printer via a module called a port monitor.

It should be noted that if the printer to be a target is a network printer connected directly to the network, the print job data is sent via a NIC (network interface card) as a network interface.

The printer receives the print job data (the print job data in the PDL format) from the print server and interprets the PDL to execute the printing process.

It should be noted that details of the printing process as used herein are described in a publication called "Resource Kit" issued for each version of "Windows".

Focusing on a configuration of the network print system (printing system) using "Windows" as described above, third parties have executed a feature expansion as will be described below.

First, though with respect to a print object created by "Windows" on the print server, the port monitor module is typically set as a program module for transferring the print job data to the physical printer, this port monitor module is replaced with a module for passing the print job data to another print service program operating on the print server. This module is a module for executing a feature in which the print job data is not sent to the printer, but for example, stored as a file on the hard disk, such that the print service program acquires the print job data by reading the above described file, executes a unique process on it and sends the processed print job data described above to the printer.

Having such a configuration, the print service program may add the feature which is not included in "Windows", as the feature of the print server to provide the feature expansion.

A distributed printing feature in the distributed printing service is realized by using the above described feature expansion. "Distributed printing feature" is a feature of logically splitting one print job to generate a plurality of split jobs, and allocating these split jobs among the plurality of printers to cause the above described plurality of printers to execute the printing process. Thereby it is possible to reduce the time required for the print job.

Though some methods may be applied to as a method for logically splitting one print job, as typical methods, there are a method for splitting the print job based on the number of copies, a method for splitting the document to be printed into a page direction, and the like.

In the case of the method for splitting the print job based on the number of copies, a sum of the numbers of copies to be printed in the respective printers equals to the number of copies specified in the print job before being split.

On the other hand, in the case of the method for splitting the document to be printed into the page direction, a collection of all of page ranges to be printed in the respective printers equals to the whole page range of the document to be printed with the print job before being split.

In the distributed printing feature, it is necessary to previously decide and set a split ratio for splitting the original print job to allocate with respect to the plurality of printers. As a method for setting the split ratio, for example, there are a method for setting the split ratio such that the numbers of output are equal with respect to the plurality of printers to be targets of the distributed printing, a method for allocating the split ratio with an inclination depending on printing speed performances of the printers such that the number of output of the printer having a fast printing speed is larger than others, and the like.

The above described two methods of splitting the print job are based on concepts of splitting which are originally different from each other, and it is also possible to combine these methods in principle.

For example, with respect to a print job for printing 10 copies of a document whose output results in 100 sheets for a copy, if the above described print job is printed with four printers, first, the print job is split into two jobs whose numbers of copies are 5 respectively, further these two jobs are split into jobs of 1 to 50 sheets and jobs of 51 to 100 sheets respectively, and the resultant four jobs (the split jobs) are allocated with respect to the four printers.

Therefore, it is necessary to set the split ratio of the print job in the distributed printing feature, in a plurality of types depending on the splitting method.

With the feature expansion in the network print system as described above, there may be printers added with the features of the following examples:

a printer configured to execute an alternate printing process according to the priority of the devices previously decided; and a printer configured to, when the error occurs in the printer, register again an unprocessed file output request registered in an output queue corresponding to the printer in which the error occurs, into another output queue corresponding to another normal printer to change an output printer.

By the way, though the above description assumes a usage form in which the a plurality of users share the print server, a form may be also considered in which a single end user uses on his machine the system for providing a value-added printing feature such as the alternate printing feature as described above.

In order to operate the above described print server, the system manager not only installs modules configuring software in the machine, but also creates the logical printer on the print server machine to be used on the above described print server system. In addition, if the system having the value-added printing feature is used on the end user's machine, the end user sets the logical printer by himself. In either case, it is necessary to set a type, an address on the network or the like of the printer depending on its environment. This setting is executed in Windows in the following method.

First, the port monitor for processing the print data to be sent to the printer is created. This is executed with a setting tool attached to the print server. The setting tool is provided with a user interface, and the user inputs information necessary for creating the port monitor. This necessary information includes at least the followings:

a model name of the printer;

an address of the network interface of the printer, which is assigned uniquely in the network;

a method for transferring the print data to the printer and setting information necessary for the transfer; and an instance name of the port monitor to be created. (Further, some features included in the print server may require more detailed information on the printer, which is omitted herein.)

Next, the printer driver is installed. This installation is executed by selecting an appropriate one of the model names of the printers specified in creation of the port monitor. Then, it is determined first whether a desired printer driver has been already installed, and if it has been installed, the installation is not executed again, and the installation is actually executed only if it has not been installed.

Finally, an instance of the logical printer is created. When the instance of the logical printer is created, the following information is specified as its attributes:

the instance name of the port monitor;

a name of the printer driver; and an instance name of the logical printer to be created.

It should be noted again that further, some features included in the print server may require more detailed information on the logical printer, which is omitted herein.

As seen with the above described attributes, the port monitor and the printer driver, which have been created or installed based on the information regarding the printer to be used, are specified in the logical printer. It should be noted here that in Windows, printer device information is not included directly in the setting information of the logical printer itself, and the printer device information is separately managed in the port monitor assigned to the logical printer and is associated with the logical printer via the port monitor. Accordingly, even if the instance of the port monitor assigned to a certain logical printer is replaced with another port monitor, there is no problem in mechanism as far as the model of the printer set for the replaced port monitor is the model which is compliant with the printer driver assigned to the above described logical printer.

As described above, by introducing the print server, it is possible to extend the printing feature of the OS to add the feature which the OS does not have originally. However, in order to do so, it is necessary for the system manager to create the one or more logical printers on the machine on which the print server operates, and set up the environment of the print server, as described above.

In addition, in the case of the form in which a single user uses the above described system for providing the value-added printing feature, the user must set up the system by himself.

However, in order to create the logical printer, it is necessary to input correctly the information on the model name or the address of the printer device, the name of an appropriate printer driver and the like. This task is not just bothersome, but also, if the end user sets up the system by himself, problems are likely to occur such that it is difficult for the end user to acquire the information for the setup, or that the end user is confused due to lack of understanding of the information necessary to input. Furthermore, even though the system manager executes this task, the task itself becomes complicated as the number of the logical printers to be created is increased, and accordingly it becomes more likely to occur mistakes in the setup.

SUMMARY OF THE INVENTION

The present invention has been made in order to eliminate the above described disadvantages and an object of the present invention is to provide an output system setting apparatus, a setting method thereof and the like with which system settings may be executed without putting a burden on a user and also without causing any mistake, when a print server or a print system for providing a value-added printing feature is installed in a computer.

Specifically, a first object of the present invention is to provide the output system setting apparatus, the setting method thereof and the like, for utilizing information set in an instance of a logical printer which has existed before the print server or the print system for providing the value-added printing feature is installed, to enable to create easily and quickly the instance of the logical printer for the above described print server or the print system for providing the value-added printing feature.

In addition, a second object of the present invention is to provide an output management device setting apparatus, a setting method thereof and the like, for searching a printer device connected to a network and utilizing information acquired from the printer device, to enable to create easily and quickly the instance of the logical printer for the above described print server or the print system for providing the value-added printing feature.

In order to realize the above described objects, the present invention has a configuration as will be described below.

A first invention is an output management device setting apparatus for an output management device utilizing a logical output device assigned with unique communication control means for conducting a communication with an output device on a network, for setting the above described logical output device, including:

control means for setting the above described unique communication control means based on information set in general communication control means assigned to the logical output device which has already existed before the above described output management device is installed.

With this configuration, it is possible to utilize a new logical output device based on the information on the existing logical output device, thereby reducing the burden on the user in the setting.

Other features and advantageous of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

First Embodiment

As a first embodiment, when a program for realizing a print server is installed in a computer, a program for auto-generating a new logical printer applied with a feature expansion by the print server using an existing logical printer will be described below.

The embodiment of the present invention will be described below with reference to the drawings.

Figure 1:
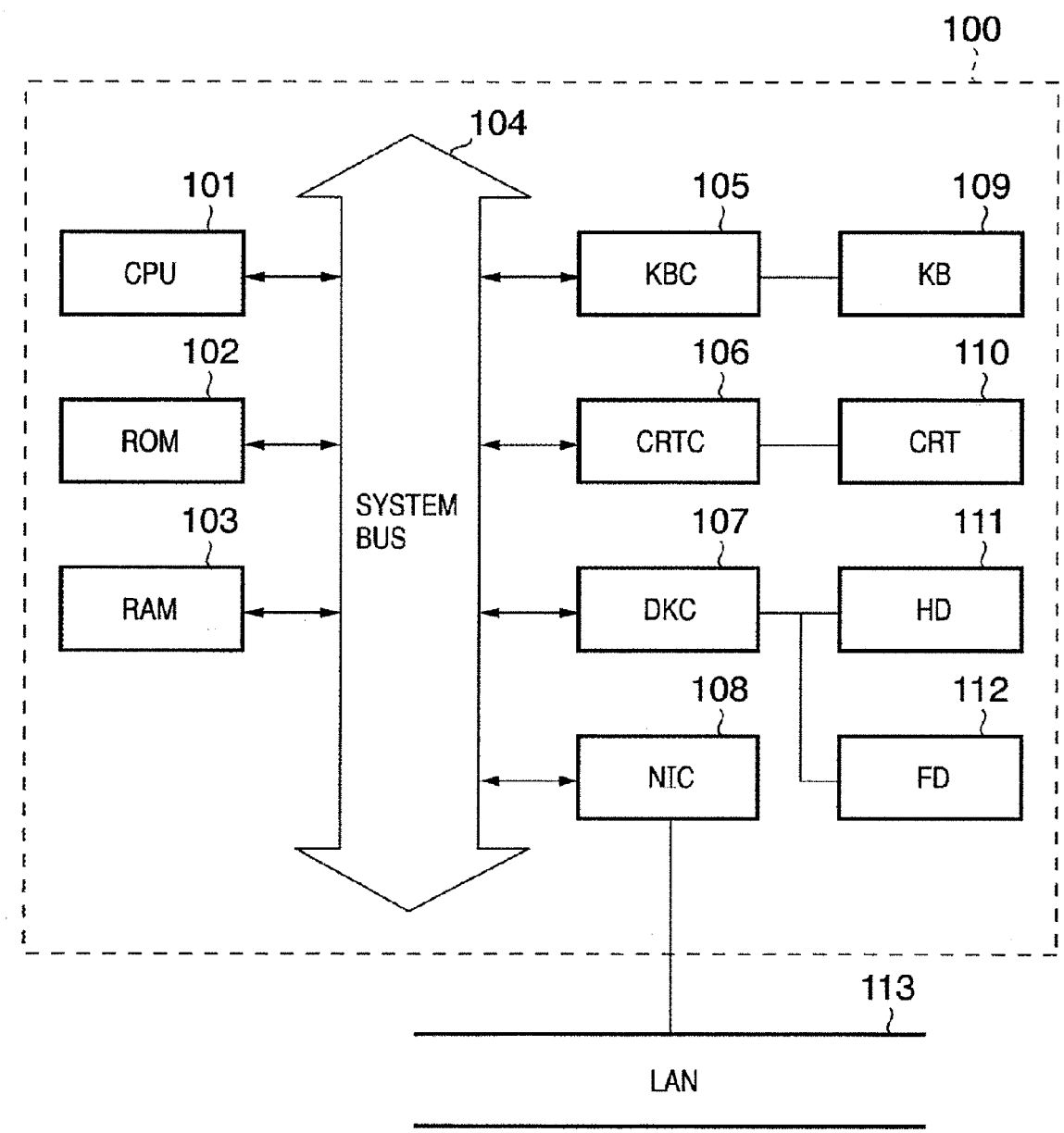
FIG. 1 is a block diagram showing a configuration of a personal computer (PC) applied with the present invention.

The present invention is applied to, for example, a personal computer (PC) 100 as shown in FIG. 1.

Figure 6:
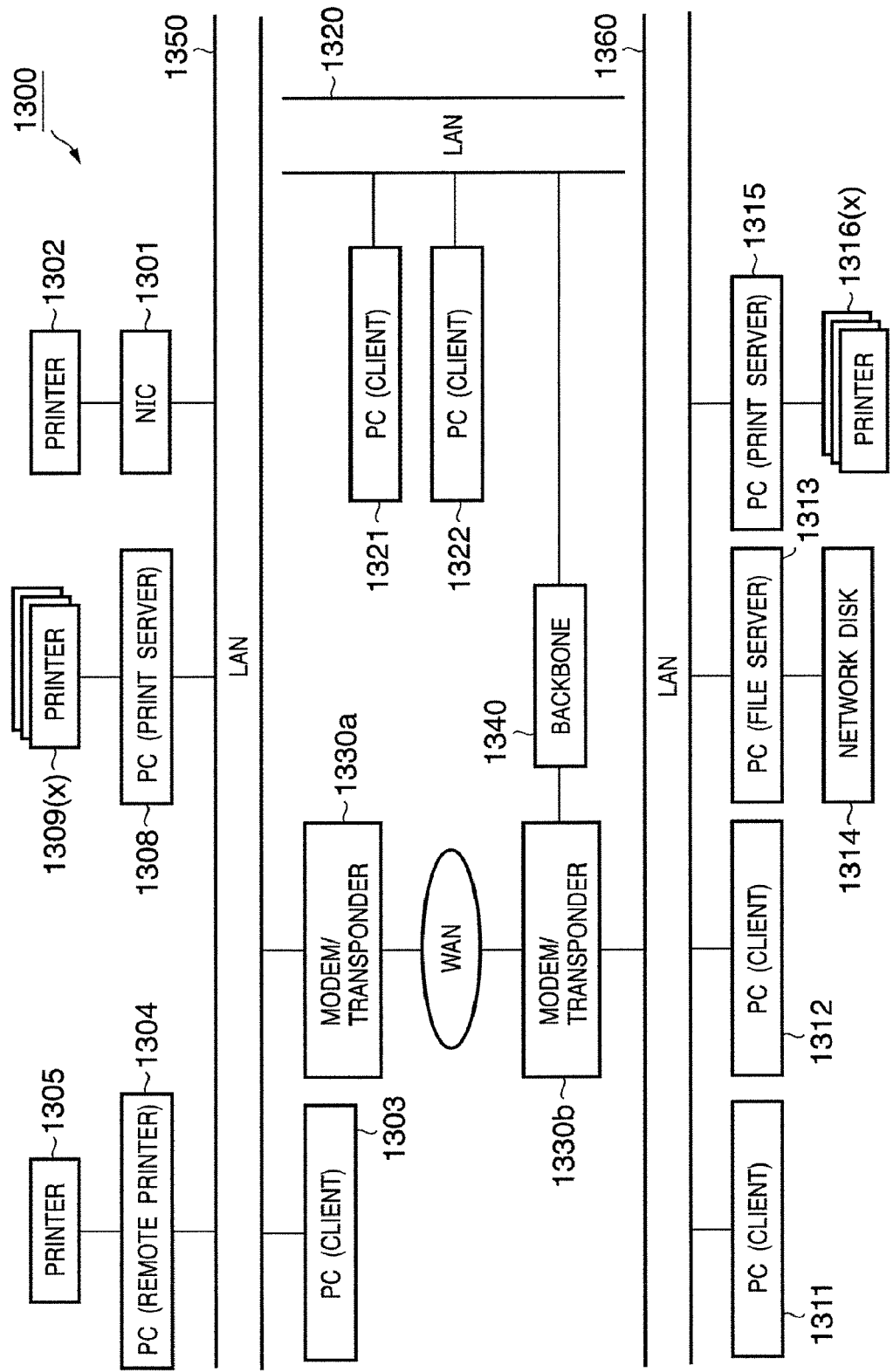
FIG. 6 shows a configuration example of a network system.

The PC 100 of this embodiment may be applied as a setting tool in a user machine, in which a print server or a print system having a value-added printing feature is installed, in a network print system as shown in FIG. 6. For example, if the PC 100 is applied as the setting tool for the print server, it may be implemented in a feature of creating the logical printer on the print server. Particularly, an object of the PC 100 of this embodiment is to increase convenience by creating the logical printer using setting information in a general logical printer which has been already set before the above described print server software or the print system having the value-added printing feature is installed, thereby eliminating a necessity for a user to input information regarding the creation of the logical printer.

<Network Configuration>

First, a configuration of a network system in which the print server of this embodiment is used will be described. FIG. 6 shows a general configuration of a network print system (printing system) 1300 using the print server.

In the network print system 1300, as shown in FIG. 6, first, various peripheral devices not shown are connectable to local area networks (LANs) 1350 and 1360.

A printer 1302 having an open architecture is connected as a shared printer to the LAN 1350 via a network interface (NIC) 1301.

The NIC 1301 is connected to the LAN 1350 such as "Ethernet", with "coaxial connector (10Base-2)" or "RJ-45 connector (10/100Base-T)" and the like.

A print server 1308 is configured with the personal computer (PC) for example, and causes a plurality of printers 1309(1), 1309(2) and the like (1309(x)) or a printer 1302 installed at a remote place and the like to execute a printing process.

PCs 1303 and 1304 are connected to the LAN 1350 and can communicate with the print server 1308 under the control of a network operating system.

Accordingly, for example, if the arbitrary PC 1303 wants to cause the printer 1302 to execute the printing process, the PC 1303 do not have to communicate with a printer 1305 via the NIC 1301 to exchange print data or control information and the like with the printer 1302, but instead the PC 1303 may leave that task to the print server 1308 as follows.

For example, first, the PC 1303 sends data of a print job created by starting application software and the like on its side, not to the printer 1302 but to the print server 1308.

The print server 1308 retains temporarily the data of the print job from the PC 1303 in a local data storage memory (not shown) such as a hard disk.

Since the print server 1308 may accept a plurality of print jobs by using the above storage memory, if the plurality of print jobs are retained waiting to be processed in the above described storage memory, the print server 1308 determines the print job to be processed next according to a predetermined policy.

The print server 1308 reads the data of the print job determined to be processed next from the above described storage memory, and sends the above described print job via the NIC 1301 to the printer 1302 or the arbitrary printer 1309(x).

Then, the print server 1308 converts with a printer driver, as necessary, the data of the print job to be sent into a page description language (PDL) and a control command supported by the printer 1302 or 1309(x) and sends them.

The PCs 1303, 1304 and the print server 1308 as described above may generate a data file, send the above described data file to the LAN 1350, receive the data file from the LAN 1350, and display and/or process the above described data file, with a general configuration of the PC.

For example, as the PCs 1303, 1304 and the print server 1308, other computer devices may be applied which are appropriate to execute network software. More specifically, it is possible to use UNIX software to include a UNIX workstation in a network, and use the above described workstation together with the PCs 1303, 1304 and the like under an appropriate status.

Here, general LANs used as a LAN 1320, the LAN 1350 and the LAN 1360 provide services to a relatively local user group, such as a user group at one floor or contiguous floors in one building.

For example, if respective users exist at other buildings or in other prefectures and the like, a wide area network (WAN) is formed as certain users put some distance from other users. The WAN is an aggregate formed by connecting a number of LANs with a high-speed digital line such as an integrated services digital network (ISDN).

Accordingly, in the network print system 1300, as shown in FIG. 6, the LAN 1320, the LAN 1350 and the LAN 1360 are connected to one another via modems/transponders 1330a, 1330b and a backbone 1340 to form the WAN.

To the LAN 1360, a PC 1311, a PC 1312, a file server 1313 having a network disk 1314 connected thereto, and a print server 1315 having a plurality of printers 1316(1), 1316(2) and the like connected thereto are connected as necessary.

In addition, to the LAN 1320, a PC 1321 and a PC 1322 are connected as necessary.

The devices connected to the LAN 1320, the LAN 1350 and the LAN 1360 may access features of the devices connected to other LANs, via the WAN connection.

Next, a configuration and an operation of the PC 100 of this embodiment will be described specifically.

<Hard Configuration of PC 100>

The PC 100 is configured with a CPU 101, a ROM 102, a RAM 103, a keyboard controller (KBC) 105 for a keyboard (KB) 109, a CRT controller (CRTC) 106 for a CRT display (CRT) 110 as a display unit, a disk controller (DKC) 107 for a hard disk (HD) 111 and a flexible disk (FD) 112, and a network interface controller (NIC) 108 for connecting with a network (LAN) 113, which are connected via a system bus 104 in communication with one another.

The CPU 101 controls each component connected to the system bus 104 as a whole by executing software stored in the ROM 102 or the HD 111, or software provided by the FD 112 (a print server program and the like).

That is, the CPU 101 controls for realizing operations in this embodiment by reading and executing a processing program according to a predetermined processing sequence from the ROM 102, or the HD 111, or the FD 112.

The RAM 103 functions as a main memory or a work area and the like in the CPU 101.

The KBC 105 controls input of instructions via the KB 109, a pointing device not shown or the like.

The CRTC 106 controls the display of the CRT 110.

The DKC 107 controls accesses with the HD 111 and the FD 112 for storing a boot program, various applications, an edit file, a user file, a network management program, the predetermined processing programs in this embodiment and the like.

The NIC 108 exchanges the data in two-way with devices or systems (a print server, client PCs, printers and the like) on a LAN 113.

In the HD 111, the print server program for functioning the PC 100 as the print server, a print server setting program applied with the present invention and the like are stored. That is, when the above described programs in the HD 111 are read and executed by the CPU 101, the PC 100 functions as the print server and the print server setting program applied with the present invention and the like Therefore, in the whole description as described below, the entity of execution is the CPU 101 with respect to hardware, unless otherwise noted. On the other hand, the entity of the control with respect to the software is the software stored in the HD 111 such as the print server program.

In this embodiment, though "WindowsNT 4.0 Server®" made by Microsoft Corp. is assumed as the OS of the PC 100 for example, the OS is not limited to it.

It should be noted that the place for storing the software such as the print server program and the print server setting program applied with the present invention is not limited to the HD 111, but for example, an arbitrary storage medium such as the FD 112 or a CD-ROM may be applied. In this case, the CPU 101 reads the programs from the above described storage medium and installs them in the HDD 111.

<Module Configuration and Operation in the Case where PC 100 Functions as Print Server Setting Program>

Figure 2:
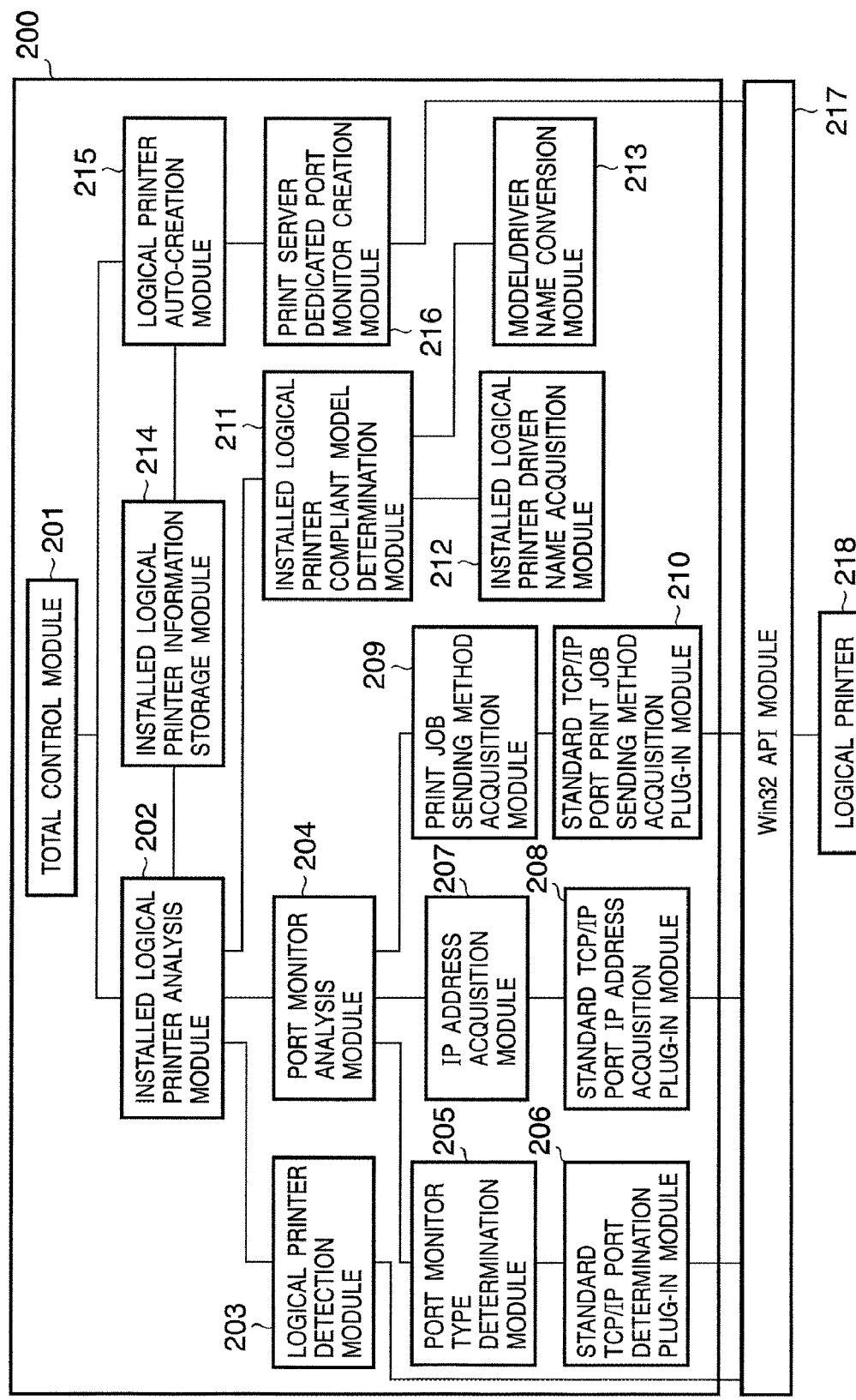
FIG. 2 is a block diagram showing a module configuration of a print server setting program in a first embodiment applied with the present invention.

FIG. 2 shows specifically an inner software module configuration of the print server setting program (=200) running on the print server in the case where the PC 100 shown in FIG. 1 operates as the print server. Here, since details of a configuration of the print server itself depart from significance of the present invention, they are omitted from the description. However, it should be noted that the above described print server uses the logical printer assigned with a unique one as a port monitor in Windows.

A total control module 201 conducts the total control of inner processes of the print server setting program 200. Specifically, the total control module 201 causes an installed logical printer analysis module 202 and a logical printer auto-creation module 215 thereunder to execute the processes sequentially, and as a result of the processes, to create the logical printer dedicated to the above described print server.

The total control module 201 first calls the installed logical printer analysis module 202. The installed logical printer analysis module 202 first determines whether the general logical printer exists or not, before creating the logical printer dedicated to the above described print server, and if the general logical printer exists, extracts contents of its setting and stores in an installed logical printer information storage module 214.

The installed logical printer analysis module 202 has thereunder a logical printer detection module 203, a port monitor analysis module 204 and an installed logical printer compliant model determination module 211.

The logical printer detection module 203 detects all of the logical printers installed in the OS and passes information on them to the installed logical printer analysis module 202.

The port monitor analysis module 204 has further thereunder a port monitor type determination module 205, an IP address acquisition module 207 and a print job sending method acquisition module 209.

The port monitor type determination module 205 determines whether the port monitor assigned to the detected logical printer is the one which is compliant with the print server setting program 200. There is a plug-in module for each compliant type of the port monitor. In this embodiment, the port monitor is compliant only with a Standard TCP/IP port prepared standardly in Windows 2000, and only a Standard TCP/IP port determination plug-in module 206 is shown in FIG. 2.

The port monitor analysis module 204 calls the IP address acquisition module 207 with respect to the logical printer determined by the port monitor type determination module 205 to have been assigned with the port monitor supported by this program. The IP address acquisition module 207 acquires the IP address set for the port monitor via an IP address plug-in module depending on the type of the port monitor (a Standard TCP/IP port IP address acquisition plug-in module is shown in this embodiment), and returns the IP address to the port monitor analysis module 204. Furthermore, the port monitor analysis module 204 also calls the print job sending method acquisition module 209. The print job sending method acquisition module 209 acquires a method for transferring print job data to a printer device, of LPR or RAW set in the port monitor, and also a queue name in the case of LPR, or a port number in the case of RAW. This acquisition is executed via the print job sending method acquisition plug-in module depending on the type of the port monitor (the Standard TCP/IP port print job sending method acquisition plug-in module is shown in this embodiment). An acquisition result is returned to the port monitor analysis module 204. The port monitor analysis module 204 passes the information collected from the port monitor to the upper installed logical printer analysis module 202.

Next, once the installed logical printer analysis module 202 completes the analysis on the port monitor, it calls the installed logical printer compliant model determination module 211 next. The installed logical printer compliant model determination module 211 first acquires a printer driver name assigned to the above described logical printer with an installed logical printer driver name acquisition module 212, and further calls a model/driver name conversion module 213 to derive a type of the printer device from the acquired printer driver name.

The port monitor analysis module 204 returns the information regarding the IP address and the LPR queue name acquired as described above to the upper installed logical printer analysis module 202, and the installed logical printer analysis module 202 stores the returned information in the installed logical printer information storage module 214. The installed logical printer information storage module 214 stores the information to be stored in tables arranged by installed logical printer names.

That is, the information to be stored in the logical printer information storage module is as follows for each logical printer:

(1) the IP address of the logical printer determined to have been assigned with the supported port monitor;
(2) the method for transferring the print job data to the printer device, of LPR or RAW set in the port monitor;
(3) the queue name in the case of LPR, or the port number in the case of RAW;
(4) the printer driver name assigned to the logical printer; and
(5) the printer device type assigned to the logical printer.

The above information is acquired from the logical printer which has been already set, and retained. In this embodiment, since it is assumed that the print server setting program 200 is compliant only with the TCP/IP, the IP address and the like are acquired and stored. However, with respect to the logical printer which has been already set, a port corresponding to that logical printer has been set, and items to be stored in the above (1) is that port which has been set. With respect to the logical printer which is compliant with the TCP/IP, since the IP address has been set as its port, that IP address is stored in the logical printer information storage module. Similarly, even with respect to the logical printer which is compliant with another protocol, on condition that the logical printer is compliant with the print server setting program 200, the port corresponding to the logical printer is acquired and stored. In addition, it is the same with respect to a printer connected locally to the print server. That is, more generally, the above information may be described in other words as follows:

(1) an address of the logical printer;
(2) the method for transferring the print data to the printer device;

(3) a destination of data sent depending on the method for transferring the print data;
(4) the printer driver name assigned to the logical printer; and
(5) the printer device type assigned to the logical printer.

Once the installed logical printer analysis module 202 completes the above processes, the total control module 201 calls the logical printer auto-creation module 215 next. The logical printer auto-creation module 215 reads the information stored in the installed logical printer information storage module 214 and executes the following processes.

First, the read IP address and a printer device model name are passed to a print server dedicated port monitor creation module 216 to create the port monitor. Next, the logical printer is created by using the created port monitor and the printer driver name read from the installed logical printer information storage module 214. These processes are executed for each installed logical printer read from the installed logical printer information storage module 214.

<Process Flow of Print Server Setting Program 200>

Figure 3:
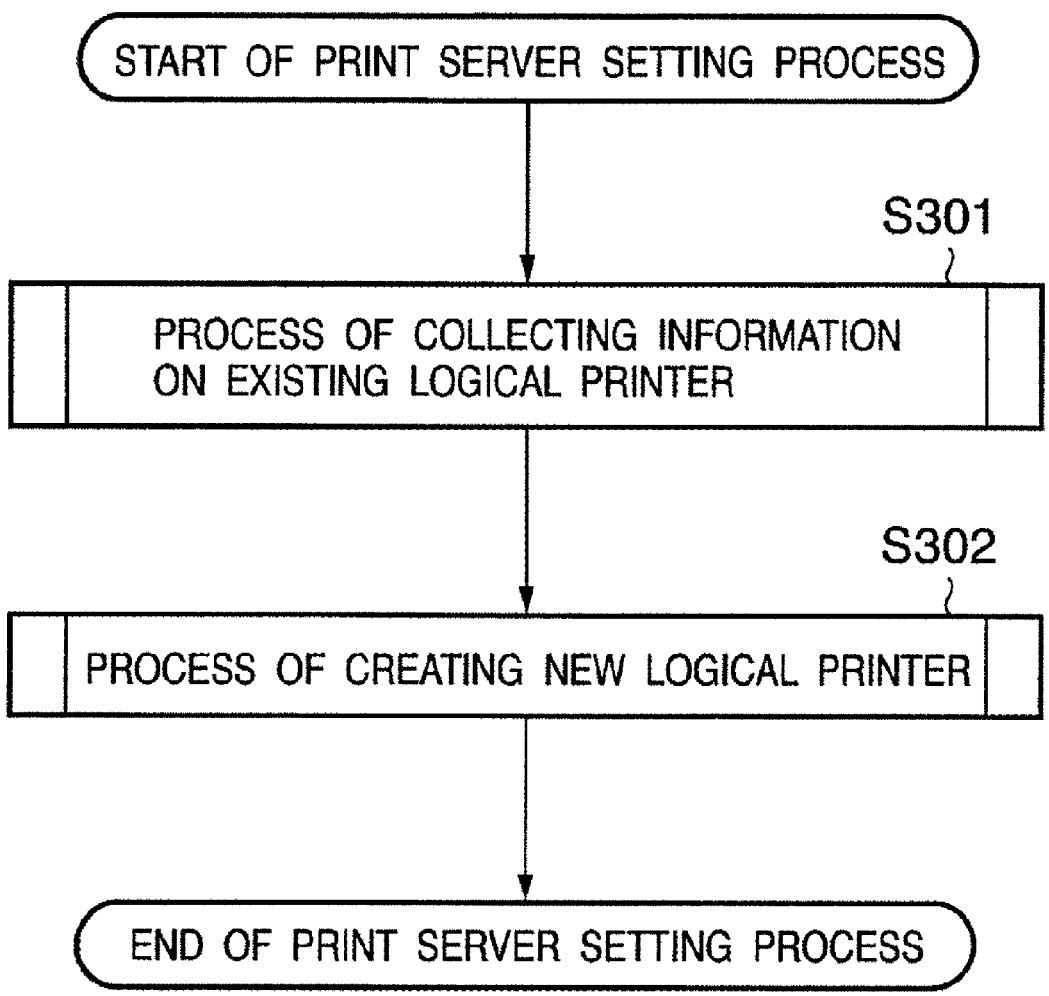
FIG. 3 is a flowchart showing a summary of a procedure of creating a logical printer in the print server setting program in the first embodiment applied with the present invention.

FIG. 3 is a flowchart showing specifically a function of the above described print server setting program 200. The program shown in FIG. 3 is an environment setting program to be executed if an auto-setup is set when the user installs software for executing a distributed printing or an alternate printing. If the auto-setup is not set, the user executes the environment setting manually.

Step S301:
The total control module 201 calls the installed logical printer analysis module 202 to detect the installed logical printer, and extracts necessary information from the detected logical printer to store it temporarily.

Step S302:
The dedicated logical printer to be used in the above described print server is created by using the information extracted and stored temporarily in step S301.

Figure 4:
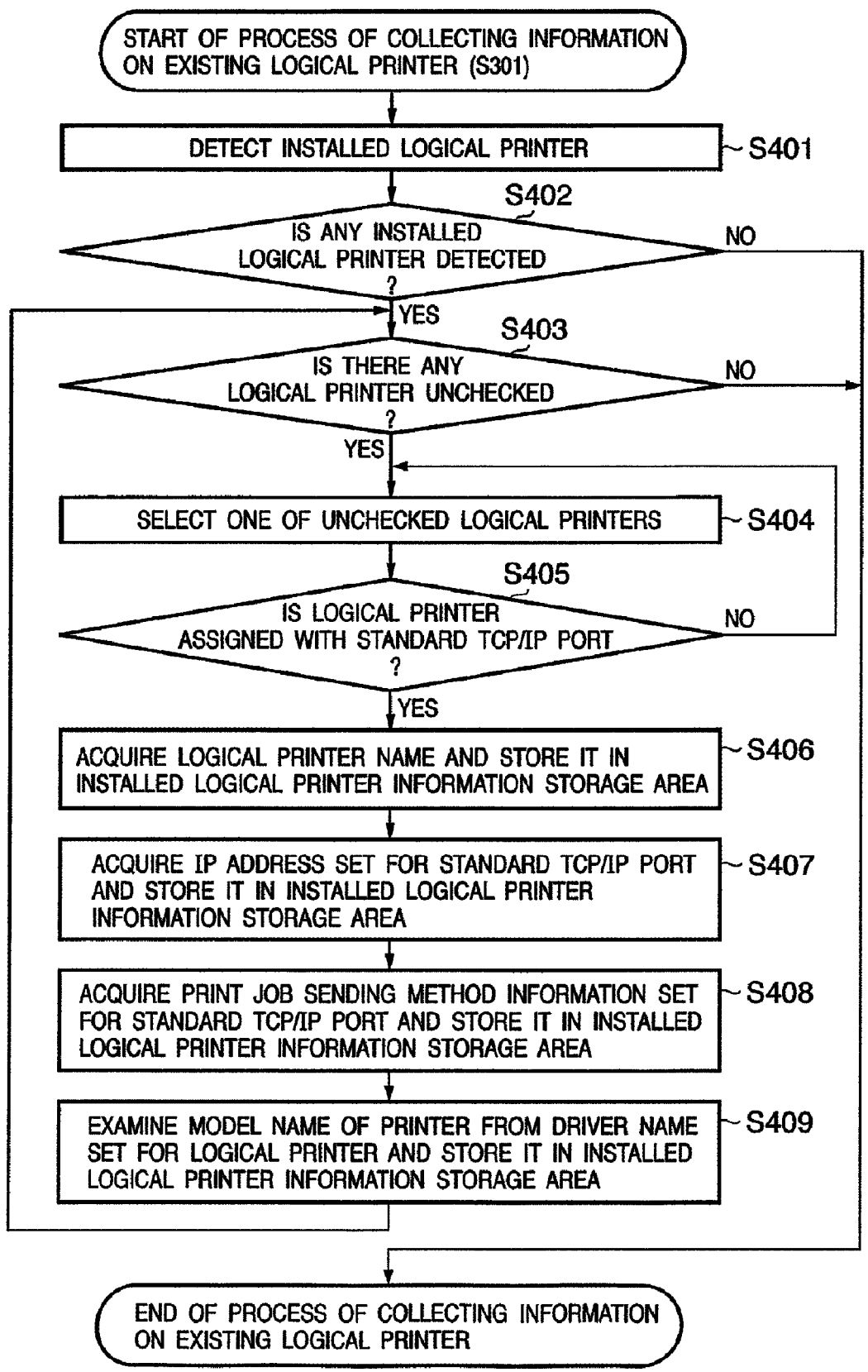
FIG. 4 is a flowchart showing details of step S301 of the flowchart shown in FIG. 3.

FIG. 4 shows the above described step S301 in more detail.

Step S401:
The logical printer detection module 203 acquires list information on the logical printer (218) installed on the OS, via Windows API (Application Program Interface) 217.

Step S402:
The installed logical printer analysis module 202 determines whether one or more logical printers are detected as a result of step S401.

Step S403:
If one or more logical printers are detected in step S402, the installed logical printer analysis module 202 controls to execute the following processes from step S404 for each of the logical printers. Therefore, the installed logical printer analysis module 202 determines whether there is any logical printer unprocessed.

Step S404:
One of the unprocessed logical printers is selected within the program.

Step S405:
The port monitor type determination module 205 and its plug-in module, the Standard TCP/IP port determination plug-in module, determine whether the port monitor assigned to the logical printer selected in step S404 is the Standard TCP/IP port.

Step S406:
The installed logical printer analysis module 202 passes the installed logical printer name received from the port monitor analysis module 204 to the installed logical printer information storage module 214 to store it.

Step S407:
The installed logical printer analysis module 202 passes the IP address which the port monitor assigned to the installed logical printer has, received from the port monitor analysis module 204, to the installed logical printer information storage module 214 to store it.

Step S408:
The installed logical printer analysis module 202 passes the print job sending method and information thereon which the port monitor assigned to the installed logical printer has, received from the port monitor analysis module 204, to the installed logical printer information storage module 214 to store it.

Step S409:
The installed logical printer analysis module 202 passes the printer device model name received from the installed logical printer compliant model determination module 211, to the installed logical printer information storage module 214 to store it. After processing of the Step S409, the process returns to the Step S403.

Figure 5:
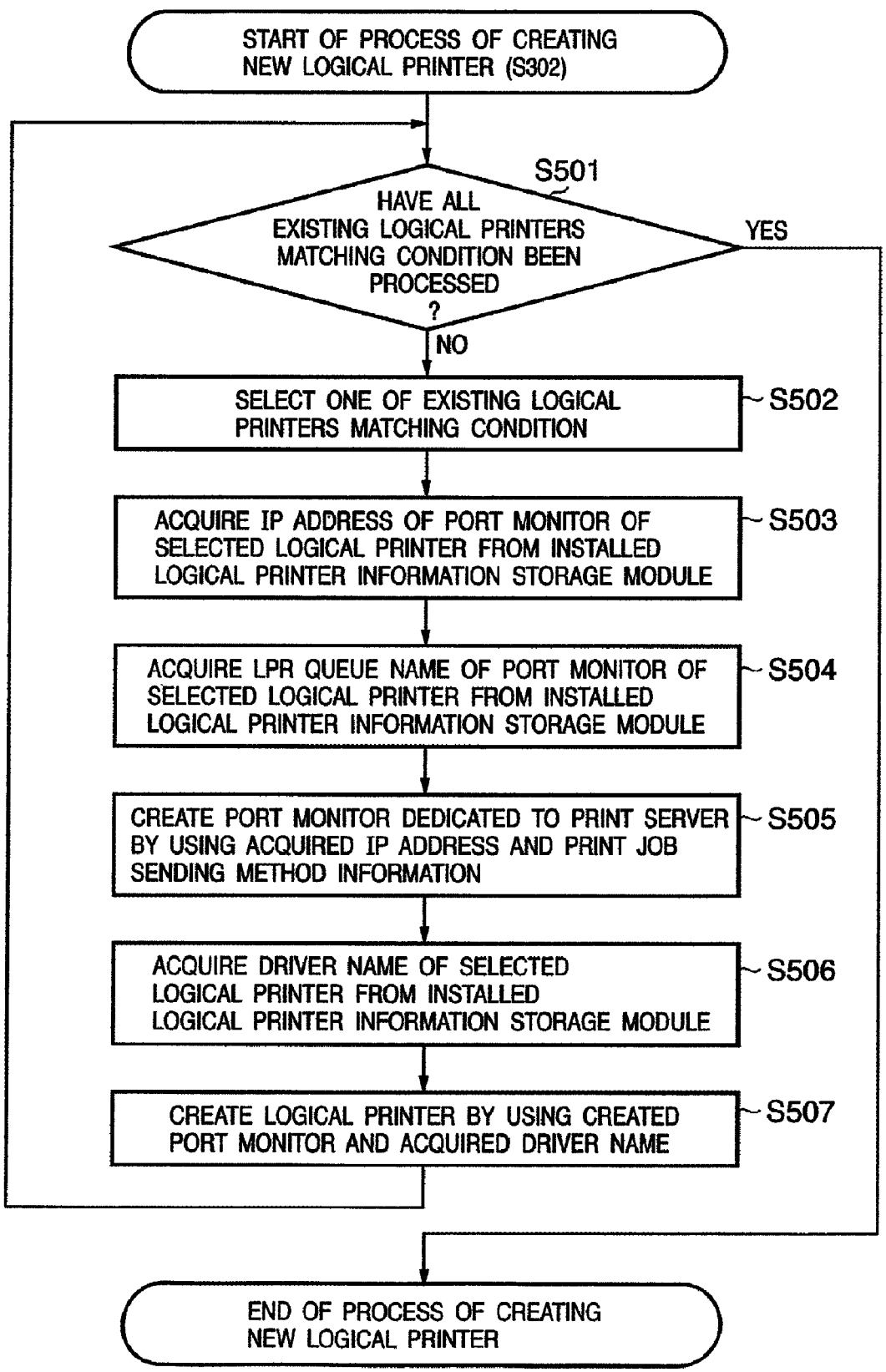
FIG. 5 is a flowchart showing details of step S302 of the flowchart shown in FIG. 3.

FIG. 5 shows step S302 of FIG. 3 in more detail.

Step S501:
It is determined whether there is any logical printer unprocessed in the installed logical printer information storage module 214.

Step S502:
One of the unprocessed logical printers in the installed logical printer information storage module 214 is selected, within the program.

Step S503:
The IP address regarding the logical printer selected in step S502 is acquired from the installed logical printer information storage module 214.

Step S504:
The print job sending method and the information thereon regarding the logical printer selected in step S502 are acquired from the installed logical printer information storage module 214.

Step S505:
The port monitor dedicated to the above described print server is created by using the information acquired in steps S503 and S504.

Step S506:
The printer driver name assigned to the logical printer selected in step S502 is acquired from the installed logical printer information storage module 214.

Step S507:
The new logical printer is created based on the port monitor created in step S505 and the printer driver name acquired in step S506.

According to the above described procedure, based on the information acquired from the logical printer which has been already registered, it is possible to create a new port monitor for realizing an extended feature to be realized in an output system, and to create the new logical printer assigned with that new port monitor. The new port monitor to be created is generated as an object in which a member function for a service provided in the new port monitor and the like are described, which are previously prepared by the print server setting program 200 according to the present invention. As the service to be realized by the member function of the new port monitor generated, there is a feature of, for example, storing the print job data in the hard disk of the print server once without sending it to the printer, then reading the print job data to apply thereto a unique process such as splitting the job depending on contents of specification specified at the same time of specifying the printing, and sending the print job data to the printer in the system, and the like. When an instance of the port monitor is generated, the IP address, the data sending method and the like retained are used as its members.

Therefore, if the existing logical printer is registered, by using the information on that logical printer, the user may receive the extended feature provided by the print server without executing the setting regarding the logical printer, when the print server is set.

As described above, according to this embodiment, it may be possible to reduce a process of creating the logical printer for a print server system to be used for the logical printer assigned with an inherent port monitor, or for the system for providing the value-added printing feature, by using the information on the logical printer which has been already installed. Thereby, this embodiment contributes to reduction in the user's effort regarding to the setting task.

Modification to the First Embodiment

In the first embodiment as described above, the logical printer to be used by the print server is newly created in addition to the existing logical printer. However, the logical printer auto-creation module 215 may also replace the port monitor of the existing logical printer with the port monitor created in step S505, in step S507 of FIG. 5. Therefore, it is possible to prevent the logical printer which is not used in the print server from remaining therein and it is possible to prevent a discrepancy between the user's intention and an output result due to misuse of the logical printer and the like.

Second Embodiment

Next, as a second embodiment, when a program for realizing a print server is installed in the computer, the print server setting program for searching the printer device connected to the network and using information acquired from the printer device, to enable to create easily and quickly an instance of the logical printer for the above described print server or the print system for providing the value-added printing feature, will be described below.

<Module Configuration and Operation in the Case where PC 100 Functions as Print Server Setting Program>

Figure 7:
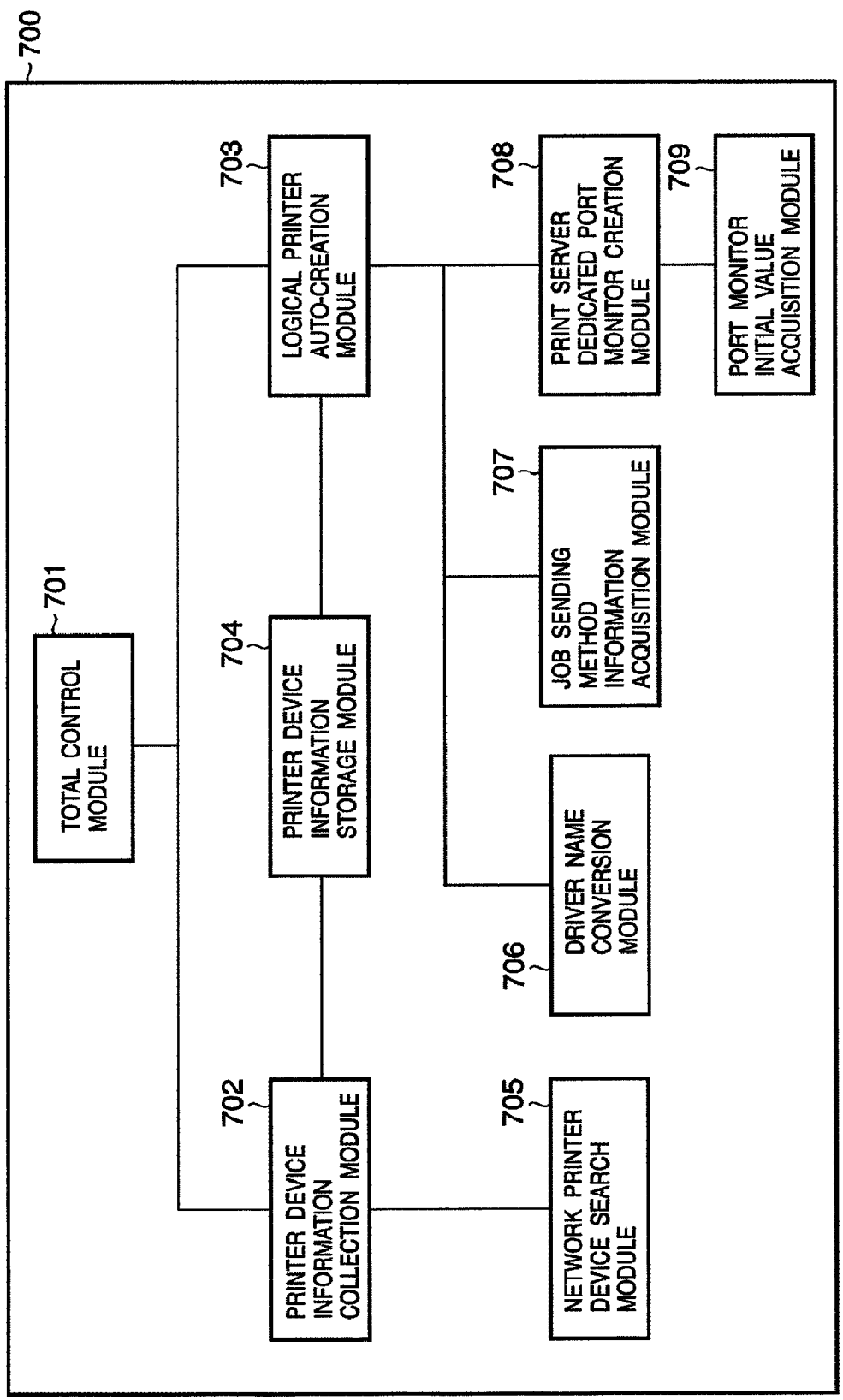
FIG. 7 is a block diagram showing a module configuration of a print server setting program in a second embodiment applied with the present invention.

FIG. 7 shows specifically, an inner software module configuration of a print server setting program 700 running on the print server in the case where the PC 100 shown in FIG. 1 operates as the print server, similarly to the first embodiment. Here, since details of the configuration of the print server itself depart from the significance of the present invention, they are omitted from the description. However, it should be noted that the above described print server uses the logical printer assigned with a unique one as the port monitor in Windows. In addition, the network system to which the print server is connected is also shown in FIG. 6, similarly to the first embodiment.

A total control module 701 conducts the total control of inner processes of the print server setting program 700. Specifically, the total control module 701 causes an printer device information collection module 702 and a logical printer auto-creation module 703 thereunder to execute the processes sequentially, and as a result of the processes, to create one or more logical printers dedicated to the above described print server.

The total control module 701 first calls a printer device information collection module 702. The called printer device information collection module 702 calls a network printer device search module 705 thereunder. The network printer device search module 705 searches the printer device connected to the network by broadcasting packets following a SNMP protocol as a network management protocol, on the network. The packet returned from the printer device which responds to the broadcasting has information on the model name and the IP address of its device. The network printer device search module 705 returns the information on the model names and the IP addresses included in all effective response packets, to the printer device information collection module 702. The printer device information collection module 702 stores the above described returned information in a printer device information storage module 704. It should be noted that this procedure of collecting the device information with the SNMP protocol is standardized by IETF and is used generally.

Once the printer device information collection module 702 completes the above process, the total control module 701 calls the logical printer auto-creation module 703 next. The logical printer auto-creation module 703 reads the model name and the IP address stored in the printer device information storage module 704 and executes the following processes.

First, if the read model name is of an unsupported model, this logical printer information is ignored and the model name of a next entry is acquired. (If the next entry does not exist, the process returns to the total control module 701.) If the read model name is a supported model, the model name is passed to a driver name conversion module 706 to acquire the printer driver name corresponding to the model name. Next, the model name is passed to a job sending method information acquisition module 707 to acquire the method for sending the print job to the printer device and initial setting information regarding it. In this embodiment, the former is LPR or RAW, and the latter has the LPR queue name in the case of LPR, or has the port number in the case of RAW. This acquired information is static information managed by the job sending method information acquisition module 707, and the information is previously decided for each model uniquely.

In addition to the IP address acquired from the printer device information storage module 704, the logical printer auto-creation module 703 passes the above described information acquired from the job sending method information acquisition module 707 to a print server dedicated port monitor creation module 708. The print server dedicated port monitor creation module 708 passes the model name and the job sending method information to a port monitor initial value acquisition module thereunder to generate initial values of various setting values of the port monitor, and acquires them. The port monitor dedicated to the print server is created by using the initial values, the above described IP address and the job sending method information.

The logical printer auto-creation module 703 creates the logical printer by using the port monitor created as described above and the printer driver name acquired as described above.

<Process Flow of Print Server Setting Program 700>

Figure 8:
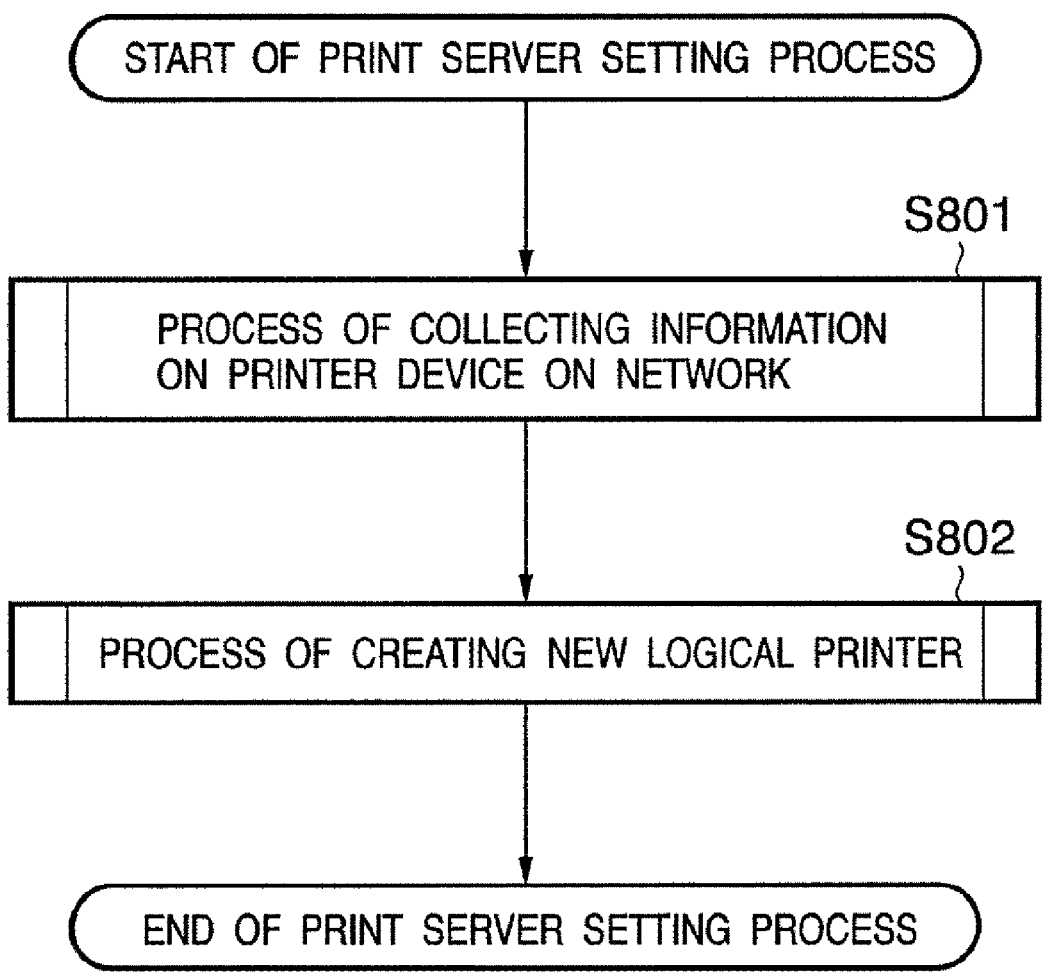
FIG. 8 is a flowchart showing a summary of a procedure of creating the logical printer in the print server setting program in the second embodiment applied with the present invention.

FIG. 8 is a flowchart showing specifically a function of the above described print server setting program 700.

Step S801:

The total control module 701 calls the printer device information collection module 702 to detect the printer device on the network, and stores the printer device information acquired then.

Step S802:

The dedicated logical printer to be used in the above described print server is created by using the information acquired and stored temporarily in step S801.

Figure 9:
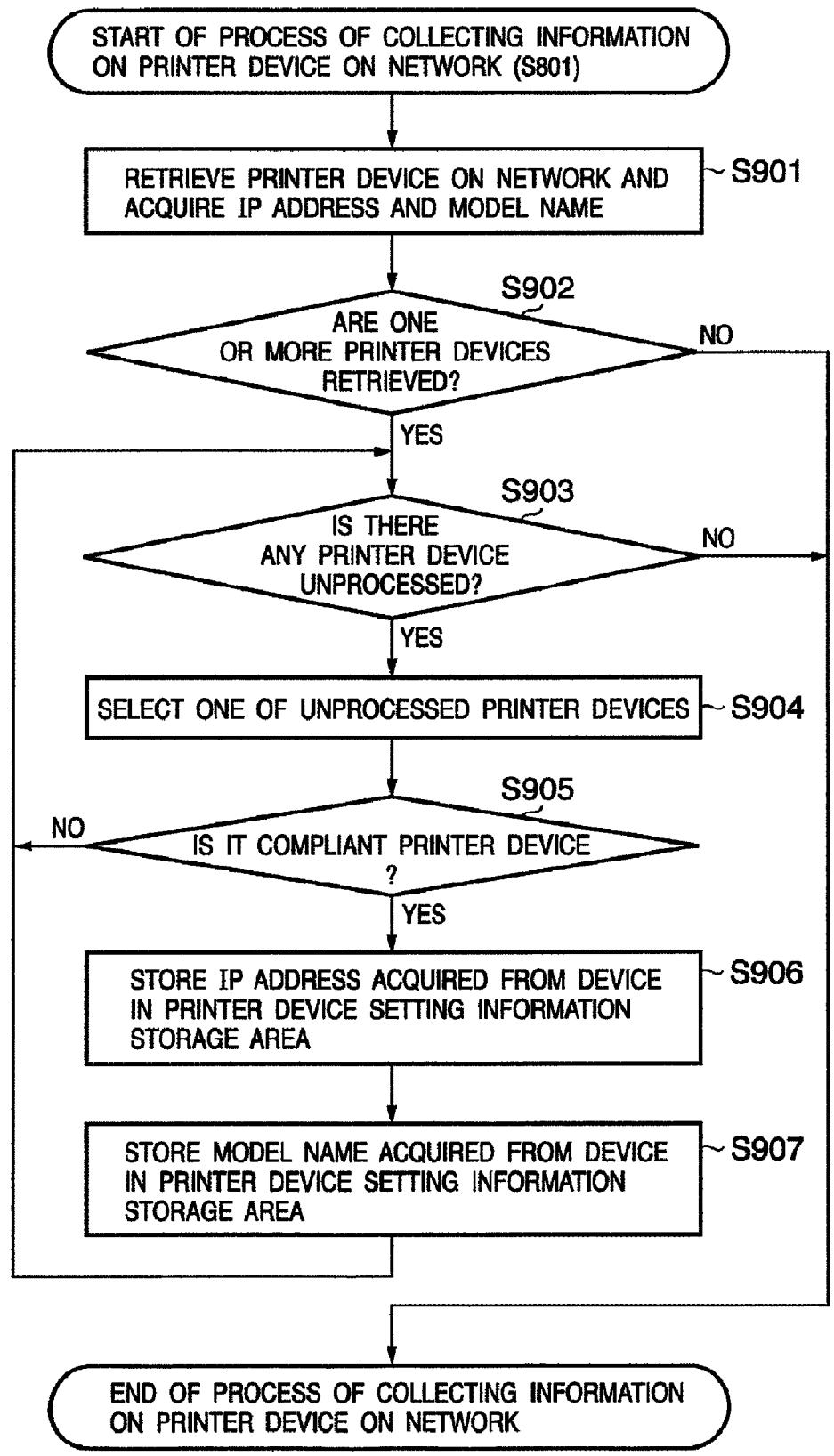
FIG. 9 is a flowchart showing details of step S801 of the flowchart shown in FIG. 8.

FIG. 9 shows the above described step S801 in more detail.

Step S901:

The printer device running on the network is detected by broadcasting the packets following the SNMP (Simple Network Management Protocol) on the network and receiving their responses. In the response packet, the model name is included as a value of a MIB (Management Information Base) object. In addition, the IP address is acquired as a value of the MIB object.

Step S902:

It is determined whether one or more printer devices are detected as a result of step S901.

Step S903:

If one or more printer devices are detected in step S902, the printer device information collection module 702 controls to execute the following processes from step S904 for each of the printer devices. Therefore, the printer device information collection module 702 determines whether there is any printer device unprocessed.

Step S904:

One of the unprocessed printer devices is selected within the program.

Step S905:

Looking at the model name acquired from the device in step S901, of the printer device selected in step S904, if it is of the model which is not compliant with the above described print server, the process skips to the process for the next printer device. Otherwise, the process proceeds to step S906.

Step S906:

The printer device information collection module 702 passes the IP address of the printer device on the network, which is acquired from the network printer device search module 705 in step S901, to the printer device information storage module 704 to store it.

Step S907:

The printer device information collection module 702 passes the model name of the printer device on the network, which is acquired from the network printer device search module 705 in step S901, to the printer device information storage module 704 to store it.

Figure 10:
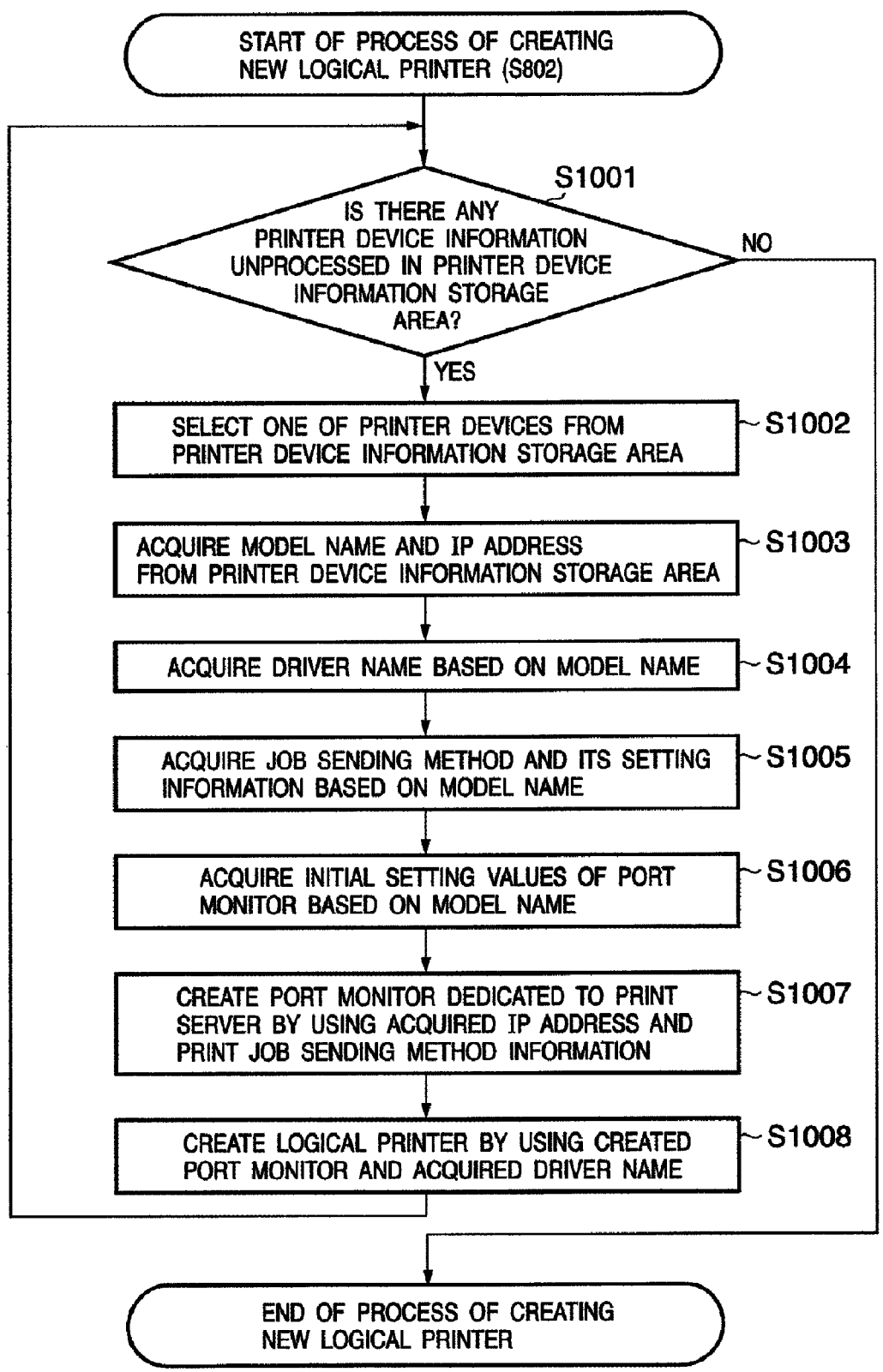
FIG. 10 is a flowchart showing details of step S802 of the flowchart shown in FIG. 8.

FIG. 10 shows the above described step S802 in more detail.

Step S1001:

It is determined whether there is any printer device unprocessed in the printer device information storage module 704.

Step S1002:

One of the unprocessed printer devices in the printer device information storage module 704 is selected internally by the program.

Step S1003:

The model name and the IP address regarding the printer device selected in step S1002 are acquired from the printer device information storage module 704.

Step S1004:

The driver name conversion module 706 generates the driver name based on the model name acquired in step S1003 and returns it to the logical printer auto-creation module 703.

Step S1005:

The job sending method information acquisition module 707 generates the job sending method and its setting information based on the model name acquired in step S1003 and returns them to the logical printer auto-creation module 703.

Step S1006:

The port monitor initial value acquisition module 709 generates the initial values of the port monitor setting based on the model name acquired in step S1003 and returns them to the print server dedicated port monitor creation module 708.

Step S1007:

The new port monitor is created based on the IP address acquired in step S1003 and the initial values of the port monitor setting generated in step S1006.

Step S1008:

The new logical printer is created based on the driver name acquired in step S1004 and the port monitor created in step S1007.

According to the above described procedure, based on the information collected from the network with the SNMP, it is possible to create the new port monitor for realizing the extended feature to be realized in the output system, and to create the new logical printer assigned with that new port monitor. The new port monitor to be created is generated as the object in which the member function for the service provided in the new port monitor and the like are described, which are previously prepared by the print server setting program 700 according to the present invention. As the service to be realized by the member function of the new port monitor generated, there is the feature of, for example, storing the print job data in the hard disk of the print server once without sending it to the printer, then reading the print job data to apply thereto the unique process such as splitting the job depending on the contents of specification specified at the same time of specifying the printing, and sending the print job data to the printer in the system, and the like. When the instance of the port monitor is generated, the IP address, the data sending method and the like retained are used as its members.

As described above, according to this embodiment, it may be possible to facilitate significantly the process of creating the logical printer for the print server system to be used for the logical printer assigned with the inherent port monitor, or for the system for providing the value-added printing feature, by the program for automatically creating the logical printer based on the information acquired from the printer device connected to the network. Thereby, this embodiment contributes to reduction in the user's effort regarding to the setting task.

Modification Common to the First and Second Embodiments

The above described first and second embodiments have disclosed the creation of the logical printer on a server machine when the print server is operated on a dedicated server machine. However, instead of the server machine, if the system for providing the value-added (the extended feature) printing is introduced on the user machine (a client computer), and that system uses the inherent port monitor, the procedures in the above described first and second embodiments may be applied.

In addition, if the printer is not found in the process of the first embodiment (the process of setting the port and the printer by using the information which has been already set for the port monitor), it is also possible to execute the process of the second embodiment (the process of collecting the information from the printer on the network to set the port and the printer) by the program.

Furthermore, the present invention may be applied to a system consisting of a plurality of devices (for example, a host computer, an interface device, a reader, the printer and the like), or may be applied to an apparatus consisting of one device (for example, a copying machine, a facsimile machine and the like).

Moreover, the object of the present invention may also be achieved by providing the system or the apparatus a storage medium (or a record medium) having stored a program code of software for realizing the functions of the above described embodiments, reading and executing the program code stored in the storage medium by the computer (or a CPU or a MPU) of above described system or the apparatus.

In this case, the program code itself read from the storage medium may realize the functions of the above described embodiments, and the program code itself and the storage medium having stored the program code may configure the present invention.

In addition, not only the case where the functions of the above described embodiments are realized by executing the program code read by the computer, but also the case is included in the present invention where an operating system (OS) or the like operating on the computer executes all or part of actual processes based on instructions of the program code and that processes may realize the functions of the above described embodiments.

Furthermore, the case is also included in the present invention where, once the program code read from the storage medium is written in a feature expansion card inserted into the computer or in a memory provided in a feature expansion unit connected to the computer, the CPU provided in the feature expansion card or the feature expansion unit or the like executes all or part of the actual processes based on the instructions of the program code, and that processes may realize the functions of the above described embodiments.

As described above, according to the present invention, it may be possible to execute system settings without putting a burden on the user and also without causing any mistake, when an output management device is set.

Specifically, the present invention utilizes the information set in an instance of a logical output device which has existed before the output management device is set, to enable to create easily and quickly the logical output device to be uses by the above described output management device.

In addition, the present invention searches an output device connected to the network and uses information acquired from the output device, to enable to create easily and quickly the logical output device to be used by the above described output management device.

As many apparently widely different embodiments of the present invention can be made without departing from the spirit and scope thereof, it is to be understood that the invention is not limited to the specific embodiments thereof except as defined in the appended claims.

The invention claimed is:

1. A non-transitory computer readable medium storing a program for causing a computer to execute an environment setting method, wherein the program is executed by the computer if automatic setup is designated when software for performing distributed printing or alternative printing is installed, the method comprising:
   collecting information about an existing logical printer, wherein collecting information includes:
      determining whether a standard TCP/IP port is assigned to the existing logical printer; and
      storing in a storage area an IP address set to the standard TCP/IP port of the existing logical printer, a job sending method, and a driver name set to the existing logical printer when it is determined that the standard TCP/IP port is assigned to the existing logical printer; and
   creating a new logical printer, wherein creating the new logical printer includes:
      determining whether a logical printer that meets a condition remains;
      selecting the logical printer when it is determined that the logical printer that meets the condition remains;
      obtaining an IP address, a job sending method, and a driver name of the selected logical printer from the storage area;
      creating a port monitor for a print server using the IP address and the job sending method of the selected logical printer; and
      creating a new logical printer using the port monitor for the print server and the driver name of the selected logical printer.

2. The non-transitory computer readable medium according to claim 1, wherein collecting information about an existing logical printer further includes:
   determining whether an existing logical printer about which information has not been collected remains;
   collecting information about the existing logical printer when it is determined that the existing logical printer about which information has not been collected remains; and
   creating a new logical printer when it is determined that no existing logical printer about which information has not been collected remains.

3. An environment setting apparatus that sets up an environment if automatic setup is designated when software for performing distributed printing or alternative printing is installed, comprising:
   a collection unit configured to collect information about an existing logical printer, wherein the collection unit
      determines whether a standard TCP/IP port is assigned to the existing logical printer; and
      stores in a storage area an IP address set to the standard TCP/IP port of the existing logical printer, a job sending method, and a driver name set to the existing logical printer when it is determined that the standard TCP/IP port is assigned to the existing logical printer; and
   a creation unit configured to create a new logical printer, wherein the creation unit determines whether a logical printer that meets a condition remains;
      selects the logical printer when it is determined that the logical printer that meets the condition remains;
      obtains the IP address, the job sending method, and the driver name of the selected logical printer from the storage area;
      creates a port monitor for a print server using the IP address and the job sending method of the selected logical printer; and
      creates a new logical printer using the port monitor for the print server and the driver name for the selected logical printer.

4. The environment setting apparatus according to claim 3, wherein the collection unit is further configured to:
   determine whether an existing logical printer about which information has not been collected remains;
   collect information about the existing logical printer when it is determined that the existing logical printer about which information has not been collected remains; and
   create a new logical printer when it is determined that no existing logical printer about which information has not been collected remains.

5. An environment setting method of setting up an environment if automatic setup is designated when software for performing distributed printing or alternative printing is installed, said method comprising:
   collecting information about an existing logical printer, wherein collecting information includes:

determining whether a standard TCP/IP port is assigned to the existing logical printer; and storing in a storage area an IP address set to the standard TCP/IP port of the existing logical printer, a job sending method, and a driver name set to the existing logical printer when it is determined that the standard TCP/IP port is assigned to the existing logical printer; and creating a new logical printer, wherein creating the new logical printer includes:

determining whether a logical printer that meets a condition remains;

selecting the logical printer when it is determined that the logical printer that meets the condition remains;

obtaining an IP address, a job sending method, and a driver name of the selected logical printer from the storage area;

creating a port monitor for a print server using the IP address and the job sending method of the selected logical printer; and creating a new logical printer using the port monitor for the print server and the driver name of the selected logical printer.

6. The environment setting method according to claim 5, wherein collecting information about an existing logical printer further includes:

determining whether an existing logical printer about which information has not been collected remains;

collecting information about the existing logical printer when it is determined that the existing logical printer about which information has not been collected remains; and creating a new logical printer when it is determined that no existing logical printer about which information has not been collected remains.

* * * * *